(12) United States Patent
Terawaki et al.

(10) Patent No.: US 7,355,654 B2
(45) Date of Patent: Apr. 8, 2008

(54) CHARACTER DISPLAY CONTROL CIRCUIT

(75) Inventors: Shusaku Terawaki, Gunma (JP); Masaaki Sato, Gunma (JP); Yoshihiro Ogawa, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 521 days.

(21) Appl. No.: 10/952,368

(22) Filed: Sep. 29, 2004

(65) Prior Publication Data
US 2005/0099543 A1 May 12, 2005

(30) Foreign Application Priority Data
Sep. 29, 2003 (JP) ............................. 2003-338038

(51) Int. Cl.
  H04N 9/43 (2006.01)
  H04N 9/64 (2006.01)
  H04N 5/1457 (2006.01)
  G09G 1/14 (2006.01)
  G06T 11/00 (2006.01)
(52) U.S. Cl. ................... 348/569; 348/34; 348/577; 348/589; 348/687; 345/26; 345/467
(58) Field of Classification Search .................. 348/34, 348/569, 577, 589, 687; 345/25–26, 467–469
See application file for complete search history.

(56) References Cited

U.S. PATENT DOCUMENTS 5,920,355 A * 7/1999 Kim ............................ 348/569
6,172,719 B1 * 1/2001 Kim ............................ 348/655
6,191,760 B1 * 2/2001 Jun et al. ...................... 345/20
6,195,079 B1 * 2/2001 Reddy ......................... 345/3.1
6,424,341 B2 * 7/2002 Choi ........................... 345/204
6,570,577 B1 * 5/2003 Callway et al. .............. 345/604
6,618,502 B1 * 9/2003 Okada et al. ................ 382/167
2002/0008707 A1 * 1/2002 Ido .............................. 345/589
2003/0103143 A1 * 6/2003 Fujimori et al. ............ 348/173
2004/0189574 A1 * 9/2004 Lee et al. ...................... 345/95

FOREIGN PATENT DOCUMENTS

JP          10-108088        4/1998

* cited by examiner

Primary Examiner—Brian P. Yenke
(74) Attorney, Agent, or Firm—Fish & Richardson P.C.

(57) ABSTRACT

A character display control circuit comprises a selection circuit to select and output, as one of the RGB signals, one of a first voltage, a second voltage lower than the first voltage, and one or more third voltages existing between the first and second voltages; a holding circuit in which first data, consisting of a plurality of bits, for the selection circuit to select and output one of the first, second, and third voltages, is set in response to display timings of the display characters; and a selection control circuit to supply the selection circuit with selection signals for the selection circuit to select and output one of the first, second and third voltages depending on the first data, second data associated with the selection of the first voltage or the second voltage, and third data associated with the selection/unselection of the third voltages.

5 Claims, 3 Drawing Sheets

CHARACTER DISPLAY CONTROL CIRCUIT

CROSS-REFERENCE TO RELATED APPLICATIONS

The present application claims priority upon Japanese Patent Application No. 2003-338038 filed on Sep. 29, 2003, which is herein incorporated by reference.

BACKGROUND OF THE INVENTION

1. Field of the Invention

The present invention relates to a character display control circuit.

2. Description of the Related Art

There are times when various information such as current channel, time and volume is displayed at a given position on a television receiver. Such an information display is carried out by generating video signals for information display with an OSD (On Screen Display) circuit, controlled by a microcomputer, and by switching between analog video signals for television images and video signals for information display as appropriate. See, e.g., Japanese Patent Application Laid-Open Publication No. Hei. 10-108088.

FIG. 3 is a block diagram of a television receiver for describing a conventional OSD output.

The conventional television receiver comprises a microcomputer 500, a mixing circuit 600, a signal processing circuit 200 and a display 300.

The microcomputer 500 performs various information processing. The microcomputer 500 contains an OSD output circuit for OSD display of information, and the OSD output circuit outputs, to the mixing circuit 600, red, blue and green (herein after referred respectively to as R, G and B) data and data I (intensity) for adjusting RGB data levels.

The data I, intended to adjust the level between "0" and "1" of the RGB data, can be adjusted to, for example, an intermediate level.

The mixing circuit 600 adjusts the RGB data levels with the data I, thus outputting the result thereof.

The signal processing circuit 200 performs signal processing based on the output result of the mixing circuit 600, outputting signals R', G' and B' obtained to the display 300.

As above, in conventional OSD display, the operation for adjusting R, G and B data levels, output by the microcomputer, according to the data I is handled by the externally attached mixing circuit 600. If the data I is not used, there are two possible display colors ("HIGH" (hereinafter H) and "LOW" (hereinafter L)) for each of R, G and B produced by the character display control circuit, resulting in 2×2×2=8 or eight possible combinations in total. That is, eight colors can be displayed, and the number of display colors can be further increased using the data I as shown in FIG. 3.

When the input data I is "L" (logic value of "0"), the mixing circuit 600 outputs data as is as normal R, G or B color. On the other hand, when the input data I is "H" (logic value of "1"), the mixing circuit 600 makes adjustment so that the color is lighter than normal—at an intermediate level, for example. In this case, there are, for example, 8+8−1=15 or 15 possible combinations of colors produced, making it possible to display 15 colors.

The reason for subtracting 1 in the above equation is that if RGB data are all "0" (black), the output is "0" despite adjustment of the display signal by the data I, causing the display color to remain unchanged.

Thus, the conventional OSD circuit adjusts the RGB data levels according to the data I using the mixing circuit 600 attached externally of the microcomputer 500, with up to 15 display colors available.

With the conventional OSD circuit, creation of colors other than the eight colors leads to the problem of increased scale as a result of use of an externally attached circuit for adjusting the RGB data and the data I. In the case of games and the like, on the other hand, the conventional 15 colors are short of meeting the demand for OSD display using more than 15 colors, for example.

SUMMARY OF THE INVENTION

It is therefore an object of the present invention to provide a character display control circuit capable of increasing OSD display colors without increasing the circuit scale.

In order to achieve the above object, according to a major aspect of the present invention there is provided a character display control circuit for generating RGB signals to display characters on screen on a display device, the circuit comprising a selection circuit to select and output, as one of the RGB signals, one of a first voltage, a second voltage lower than the first voltage, and one or more third voltages existing between the first and second voltages; a holding circuit in which first data, consisting of a plurality of bits, for the selection circuit to select and output one of the first, second, and third voltages, is set in response to display timings of the display characters; and a selection control circuit to supply the selection circuit with selection signals for the selection circuit to select and output one of the first, second and third voltages depending on the first data, second data associated with the selection of the first voltage or the second voltage, and third data associated with the selection/unselection of the third voltages.

According to the present invention, it is possible to increase OSD display colors in number without increasing the circuit scale.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Configuration of a Character Display Control Circuit>

Figure 1:
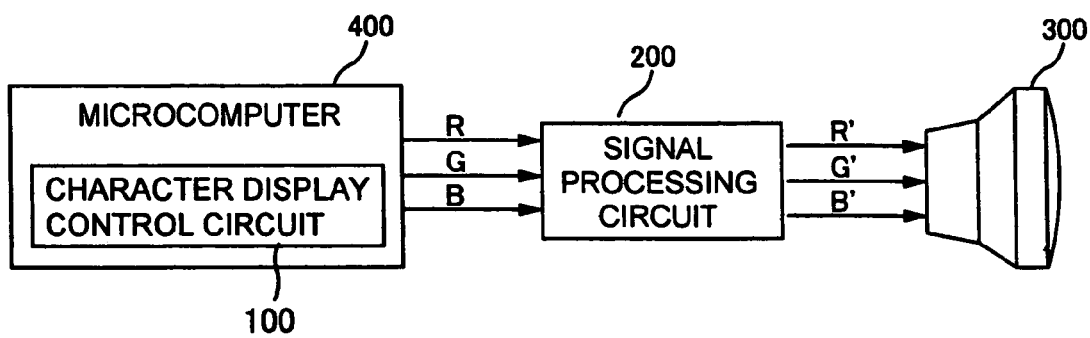
FIG. 1 is a block diagram of a television receiver including a character display control circuit according to the present invention.

FIG. 1 is a block diagram for describing a character display control circuit according to an embodiment of the present invention. As shown in the figure, a television receiver has a microcomputer 400 that includes a character display control circuit 100 and handles various information processing, the signal processing circuit 200 for handling signal processing of RGB signals output from the character display control circuit 100, and the display 300 for displaying images based on R', G' and B' signals output from the signal processing circuit 200.

Figure 2:
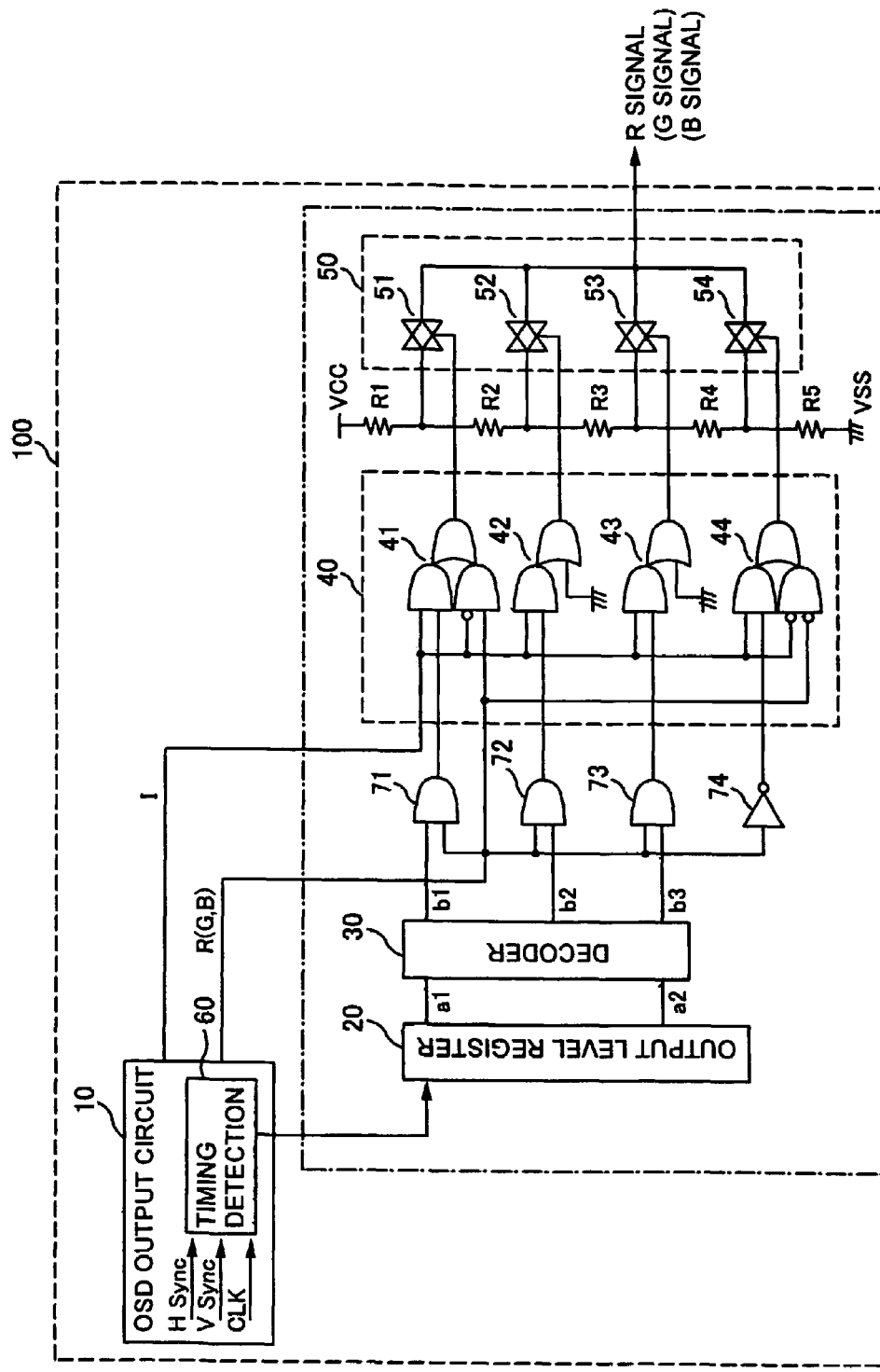
FIG. 2 is a configuration diagram for describing the character display control circuit according to the present invention.
Figure 3:
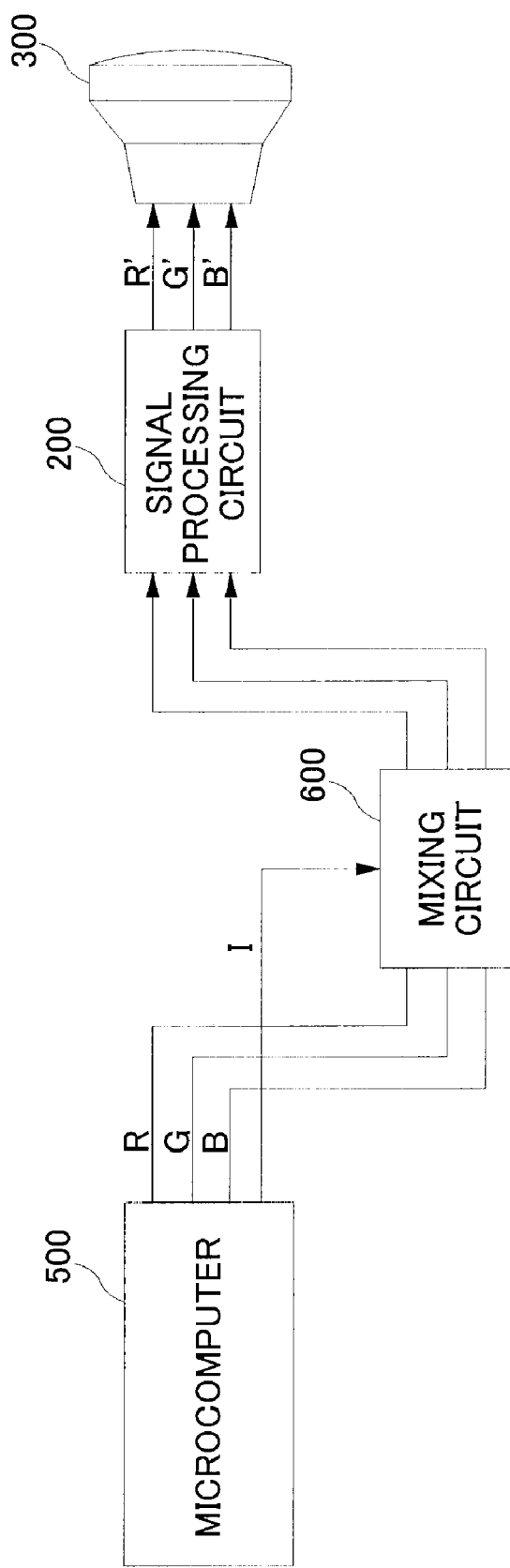
FIG. 3 is a block diagram of a television receiver for describing a conventional OSD output.

FIG. 2 shows a configuration for describing the character display control circuit 100 in the microcomputer 400. In the figure, the portion enclosed by the dot and dash line is the same in configuration for all colors of R, G and B. In the embodiment of the present invention, therefore, a description will be made only on the case of R for convenience of description, and so the description of the cases of G and B will be omitted.

The character display control circuit 100 according to the embodiment of the present invention has an OSD output circuit 10, an output level register ("holding circuit") 20, a decoder 30, an output level selector 40 and a ladder output switching circuit ("selection circuit") 50.

The OSD output circuit 10 outputs data R ("second data") and data I ("third data") for adjusting the level of the data R. The OSD output circuit 10 also has a timing detection circuit 60 ("setting circuit")—a circuit to which a horizontal synchronizing signal HSync, a vertical synchronizing signal VSync and a clock CLK, higher in frequency than the HSync, are input. The timing detection circuit 60 sets, for example, two-bit data ("first data") in the output level register 20 for a screen position corresponding to the HSync and VSync. In the output level register 20, data of (L, H) or (L, L) is stored as (a1, a2). It does not matter which combinations of "H"0 and "L" for (a1, a2) are used as long as the output (b1, b2, b3) of the decoder 30 produces the values described below.

The decoder 30 converts the two-bit data stored in the output level register 20 to a three-value output. For example, the output (b1, b2, b3) of the decoder 30 is (L, H, L) when the input is (L, H) and (L, L, H) when the input is (L, L). That is, either of b2 and b3 is "H", whereas all others are "L."

AND circuits 71, 72 and 73 enable or disable the output of the data R according to b1, b2 and b3 of the output of the decoder 30. Since b1 is "L", the AND circuit 71 outputs "L" irrespective of the data R. The AND circuit 72 outputs the data R as is when b2 is "H" and outputs "L" irrespective of the value of the data R when b2 is "L." The AND circuit 73 outputs the data R as is when b3 is "H" and outputs "L" irrespective of the value of the data R when b3 is "L."

An inverter 74 receives the data R as input and outputs a level opposite to the data R.

The output level selector 40, provided with multiplexers 41, 42, 43 and 44, controls the ladder output switching circuit 50 on the basis of the levels of the data I, data R and the decoder 30.

The multiplexer 41 selectively outputs the output of the AND circuit 71 or the data R depending on the value of the data I. Specifically, the multiplexer 41 outputs the data R when the data I is "L" and outputs the output of the AND circuit 71 when the data I is "H."

The multiplexer 42 selectively outputs the output of the AND circuit 72 depending on the value of the data I. The multiplexer 42 outputs "L" when the data I is "L" and outputs the output of the AND circuit 72 when the data I is "H."

The multiplexer 43 selectively outputs the output of the AND circuit 73 depending on the value of the data I. The multiplexer 43 outputs "L" when the data I is "L" and outputs the output of the AND circuit 73 when the data I is "H."

The multiplexer 44 selectively outputs the output of the AND circuit 74 or the data R depending on the value of the data I. The multiplexer 44 outputs a level opposite to the data R when the data I is "L" and outputs the output of the inverter 74 when the data I is "H."

The multiplexers 41, 42, 43 and 44 described above are an example for implementing the present invention. Other configurations may be employed as long as the input-to-output relationship of the input level selector 40 is the same.

Having transmission gates 51, 52, 53 and 54, the ladder output switching circuit 50 outputs a value obtained by resistance-dividing the voltage between power supply Vcc and ground Vss according to the output of the output level selector 40. As shown in the figure, resistors R1, R2, R3, R4 and R5 are connected in series between the power supply Vcc (e.g., 5V) and the ground Vss (e.g., 0V).

The transmission gates 51, 52, 53 and 54 are connected commonly at one end, with the other end of the transmission gate 51 connected between the resistors R1 and R2. The transmission gate 51, controlled in terms of conduction by the output of the multiplexer 41, outputs, at its conduction, a value (e.g., 3.8V) ("first voltage"), obtained by resistance-dividing the supply voltage Vcc between (R2+R3+R4+R5) and R1, as an R signal.

Similarly, the transmission gate 52 is connected between the resistors R2 and R3 at the other end. The transmission gate 52, controlled in terms of conduction by the output of the multiplexer 42, outputs, at its conduction, a value (e.g., 2.9V), obtained by resistance-dividing the supply voltage Vcc between (R3+R4+R5) and (R1+R2), as the R signal.

The transmission gate 53 is connected between the resistors R3 and R4 at the other end. The transmission gate 53, controlled in terms of conduction by the output of the multiplexer 43, outputs, at its conduction, a value (e.g., 2.4V), obtained by resistance-dividing the supply voltage Vcc between (R4+R5) and (R1+R2+R3), as the R signal.

The transmission gate 54 is connected between the resistors R4 and R5 at the other end. The transmission gate 54, controlled in terms of conduction by the output of the multiplexer 44, outputs, at its conduction, a value (e.g., 1.0V) ("second voltage"),obtained by resistance-dividing the supply voltage Vcc between R5 and (R1+R2+R3+R4), as the R signal. It should be noted that one or more third voltages are defined between the maximum voltage and the minimum voltage in the output of the R signal. For example, in the present embodiment, two voltages of 2.9V and 2.4V are set as the third voltage. In this case, the "number of the third voltages" is two.

With the above configuration, it is possible to set the R signal to four different levels according to the data I, the data R and the register setting. Using the same configuration, four different output levels can also be set for data G and B.

<Operation of the Character Display Control Circuit>

A description will be given next of the operation of the character display control circuit 100 shown in FIG. 2.

First, two-bit data (a1, a2) is set in the output level register 20 based on HSync, VSync and CLK, and then the two-bit data is converted to three values (b1, b2, b3) by the decoder 30. The b1 is "L" as described above, whereas one of b2 and b3 is "H" and the other "L."

i) When the Data I is "L" and the Data R "H"

The output of the multiplexer 41 becomes "H", whereas the outputs of the multiplexers 42, 43 and 44 become "L", turning on the transmission gate 51 of the ladder output switching circuit 50. Therefore, a value (e.g., 3.8V), obtained by resistance-dividing the supply voltage Vcc between (R2+R3+R4+R5) and R1, is output as the R signal. That is, the first voltage is output in this case irrespective of the output of the decoder 30.

ii) When the Data R is "L"

The output of the multiplexer 44 becomes "H", whereas the outputs of the multiplexers 41, 42 and 43 become "L", turning on the transmission gate 54 of the ladder output switching circuit 50. Therefore, a value (e.g., 1.0V), obtained by resistance-dividing the supply voltage Vcc between R5 and (R1+R2+R3+R4), is output as the R signal. That is, the second voltage is output in this case irrespective of the data I and the output of the decoder 30.

iii) When Both the Data I and the Data R are "H"

First, when (b1, b2, b3)=(L, H, L), the output of the AND circuit 72 becomes "H", whereas the outputs of the AND circuits 71 and 73 and the inverter 74 become "L." Then, in the output level selector 40, the output of the multiplexer 42 becomes "H", whereas the outputs of the multiplexers 41, 43 and 44 become "L", turning on the transmission gate 52 of the ladder output switching circuit 50. Therefore, a value (e.g., 2.9V), obtained by resistance-dividing the supply voltage Vcc between (R3+R4+R5) and (R1+R2), is output as the R signal.

Next, when (b1, b2, b3)=(L, L, H), the output of the AND circuit 73 becomes "H", whereas the outputs of the AND circuits 71 and 72 and the inverter 74 become "L." Then, in the output level selector 40, the output of the multiplexer 43 becomes "H", whereas the outputs of the multiplexers 41, 42 and 44 become "L", turning on the transmission gate 53 of the ladder output switching circuit 50. Therefore, a value (e.g., 2.4V), obtained by resistance-dividing the supply voltage Vcc between (R4+R5) and (R1+R2+R3), is output as the R signal.

Thus, when the data I is "L", the output value of the decoder 30 is not reflected, causing the transmission gate 51 or 54 to be selected depending on the value of the data R. When both the data I and data R are "H", the output value of the decoder 30 is reflected, causing the transmission gate 52 or 53 to be selected.

Therefore, the character display control circuit 100 can set four-value output levels through logic operation of the data R, the data I and the output of the decoder 30. By employing the same configuration for G and B, it is possible to set four values for each of G and B, thus resulting in 4×4×4=64 OSD display colors as possible combinations.

Here, while the data I can be changed in each horizontal scan period during character display, the value of the output level register 20 is fixed and cannot be changed.

However, the timing detection circuit 60 can output, based on HSync indicating that horizontal scan lines change at given timings, an interrupt signal—a signal for setting a value in the output level register 20—to the microcomputer 400. As the microcomputer 400 accepts the interrupt signal, the character display control circuit 100 can set the value of two-bit data, held in the output level register 20, to a different value between different horizontal scan lines.

Therefore, the above-described 64 colors can be used during on-screen character display, allowing enriched color display.

As described above, the character display control circuit 100 according to the present invention handles color adjustment of the respective RGB data and the data I without using the externally attached mixing circuit 400, thus keeping the circuit scale unchanged. It is also possible to further increase displayable colors in number by using a register storing a two-bit data for each of RGB colors and outputting arbitrary voltage levels from the ladder output level switching circuit 50 with four taps. Additionally, output level is selected through logic operation thanks to its hardware configuration, thus lightening software processing. Further, it is possible to set a different value in the register between horizontal scan lines, thus increasing the number of displayable colors in character display.

While a specific description was made on the embodiment of the present invention based on the embodiment, the present invention is not limited thereto, and it should be understood that various modifications can be made without departing from the spirit of the present invention. By making simple changes such as making the output level register three-bit or longer, providing six or more resistors in the ladder output switching circuit, and configuring a decoder and output level selector to handle such an output switching, the character display control circuit can display more than 64 colors.

Although the preferred embodiment of the present invention has been described in detail, it should be understood that various changes, substitutions and alterations can be made therein without departing from the spirit and scope of the invention as defined by the appended claims.

What is claimed is:

1. A character display control circuit for generating RGB signals to display characters on screen on a display device, the circuit comprising, for each of an R signal, a G signal, and a B signal that comprise the RGB signals:

resistors connected in series to output a first voltage, a second voltage lower than the first voltage, and a third voltage existing between the first and second voltages;

a selection control circuit to output selection signals based on a first data for adjusting the voltage level of one color signal of the RGB signals, a second data indicating the logic level of the color signal, and a third data indicating whether the voltage level of the color signal should be adjusted based on the first data, wherein the selection signals are signals for making the voltage level of the color signal one of:

the first voltage when the second data is at a first logic level and the third data is at a second logic level, irrespective of the first data, the second voltage when the second data is at a third logic level and the third data is at the second logic level, irrespective of the first data, or when the second data is at the third logic level and the third data is at a fourth logic level, and the third voltage in response to the first data when the second data is at the first logic level and the third data is at the fourth logic level; and a selection circuit to select and output, as the color signal, one of the first, second, and third voltages based on the selection signals output from the selection control circuit.

2. The character display control circuit according to claim 1, wherein the selection control circuit includes:

a decoder to decode the first data corresponding to the number of the third voltages, and a logic circuit to output the selection signals through logic operation of the output of the decoder, the second data and the third data.

3. The character display control circuit according to claim 1, further comprising:

a holding circuit in which the first data is set; and a setting circuit to set the first data in the holding circuit, wherein the setting circuit is capable of changing the value of the first data for each of horizontal scan lines making up a video signal.

4. The character display control circuit according to claim 1, wherein the character display control circuit is integrated.

5. The character display control circuit according to claim 4, wherein the character display control circuit is a microcomputer.

* * * * *